United States Patent [19]
Tobin

[11] Patent Number: 5,906,781
[45] Date of Patent: May 25, 1999

[54] METHOD OF USING THERMALLY REVERSIBLE MATERIAL TO FORM CERAMIC MOLDS

[75] Inventor: James Robert Tobin, Cincinnati, Ohio

[73] Assignee: The Procter & Gamble Company, Cincinnati, Ohio

[21] Appl. No.: 08/764,675

[22] Filed: Dec. 11, 1996

Related U.S. Application Data

[60] Provisional application No. 60/029,051, Oct. 24, 1996.

[51] Int. Cl.$^6$ .................................................. B29C 33/40
[52] U.S. Cl. ........................................... 264/220; 264/221
[58] Field of Search ....................................... 264/220, 221

[56] References Cited

U.S. PATENT DOCUMENTS

| | | | |
|---|---|---|---|
| 3,605,855 | 9/1971 | Nakata ....................................... | 164/23 |
| 3,751,271 | 8/1973 | Kimura et al. .......................... | 106/40 R |
| 3,823,002 | 7/1974 | Kirby, Jr. et al. ....................... | 29/182.1 |
| 3,829,295 | 8/1974 | Farmer et al. ........................... | 29/182.1 |
| 3,882,220 | 5/1975 | Ryder ........................................ | 264/221 |
| 3,894,575 | 7/1975 | Baum ........................................ | 164/97 |
| 3,929,476 | 12/1975 | Kirby, Jr. et al. ........................ | 75/214 |
| 4,146,080 | 3/1979 | Baum ........................................ | 164/97 |
| 4,161,207 | 7/1979 | Fluckiger et al. ........................ | 164/80 |

(List continued on next page.)

FOREIGN PATENT DOCUMENTS

| | | | |
|---|---|---|---|
| 0625386 A1 | 11/1994 | European Pat. Off. .......... | B22C 7/02 |
| 53-021036 | 2/1978 | Japan ............................... | B22C 7/02 |
| 5120-448 | 3/1979 | Japan ............................... | B22C 9/06 |
| 55-117543 | 9/1980 | Japan ............................... | B22C 9/06 |
| 62-227547 | 6/1987 | Japan ............................... | B22C 7/02 |
| 403189064 | 12/1989 | Japan ............................. | B22D 19/00 |
| 818827 | 8/1959 | United Kingdom . | |
| WO 90/01385 | 2/1990 | WIPO . | |

OTHER PUBLICATIONS

"Recommended Foundry Procedure For Shell Investment Casting Using QuickCast Stereolithography Patterns"—QuickCast Foundry Reports—pp. 4–7—Dr. P. F. Jacobs—Apr., 1993.
Metal Parts From Selective Laser Sintering of Metal–Polymer Powders:—Sold Freeform Fabrication Symposium Proceedings—pp. 141–146—Badrinarayan & Barlow—1992.
"Precision Casting of Plastic Tooling by the Unicast Process"—SME Paper #CM70–118—R.J. Fitzgerald No date.
"Metal Parts Generation By Three Dimensional Printing"—Michaels, Sachs, Cima—Conference Proceedings, Fourth International Conference on Rapid Prototyping—1993.
"KELTOOL: Fast Tooling From Rapid Prototype Patterns"—Rapid Prototyping Report, vol. #1—Jun., 1991.
Tool And Manufacting Engineers Handbook, vol. #2—Chapter 16, pp. 52–66—Society of Manufacturing Engineers—1984.
"Options Grow For Fast Mold Tooling"—Machine Design—Horner & Frantz—pp. 54–56—Sep. 12, 1996.
"Rapid Manufacture of Prototype Injection Molds Using the Selective Laser Sintering Process"—Masters Thesis for University of Texas at Austin—James R. Tobin—May, 1994 Chapt 2 only—Rapid Mold Fab Techs.

*Primary Examiner*—Christopher A. Fiorilla
*Attorney, Agent, or Firm*—William Scott Andes

[57] ABSTRACT

A method for forming a ceramic mold comprises the step of placing a pattern having critical pattern surfaces in a flask having an open end. The critical pattern surfaces face upward toward the open end. Successive steps include adding a concentrated heat reversible gel solution to the flask to cover the critical pattern surfaces, and cooling the gel solution to form an elastic solid gel mold. The gel mold has critical gel mold surfaces inverse to the critical pattern surfaces. Further steps include removing the pattern from the elastic gel mold, casting a ceramic mold around the gel mold, and liquifying the gel mold to remove it from the ceramic mold. The ceramic mold has critical ceramic surfaces inverse to the critical gel mold surfaces, thereby accurately replicating the critical pattern surfaces.

7 Claims, 1 Drawing Sheet

U.S. PATENT DOCUMENTS

| | | | |
|---|---|---|---|
| 4,327,156 | 4/1982 | Dillon et al. | 428/568 |
| 4,455,353 | 6/1984 | Bruce | 428/553 |
| 4,669,522 | 6/1987 | Griffin | 164/97 |
| 5,252,273 | 10/1993 | Sakai et al. | 264/86 |
| 5,266,252 | 11/1993 | Buck et al. | 264/86 |
| 5,333,667 | 8/1994 | Louat et al. | 164/97 |
| 5,507,336 | 4/1996 | Tobin | 164/34 |

METHOD OF USING THERMALLY REVERSIBLE MATERIAL TO FORM CERAMIC MOLDS

CROSS-REFERENCE TO RELATED APPLICATION

This is a new application having support in my prior provisional application, Ser. No. 60/029,051, entitled "Thermally Reversible Material for Forming Ceramic Molds", filed on Oct. 24, 1966.

FIELD OF THE INVENTION

This invention relates to a method for preparing an accurate ceramic mold by using a heat reversible material to make an intermediate mold of a pattern and then using the intermediate mold for casting the ceramic mold. The ceramic mold can then be used to create a more durable metal mold for casting multiple plastic parts similar to the original pattern.

BACKGROUND OF THE INVENTION

Getting new products to the market faster than one's competition is recognized as a key to gaining a large market share. One area of product development having a significant impact on overall market timing is the making of product and package prototypes for market testing. Such testing usually requires multiple look-like, feel-like, and function-like prototypes for consumers to examine or use.

Package components generally involve plastic parts made in very expensive, multiple cavity, steel molds. For example, most bottles are blow-molded and most bottle closures are injection molded. It usually takes large production quantities to justify the cost of a production mold with many cavities. For smaller markets, or for making only a few hundred test parts, single cavity molds or prototype molds are created. Prototype molds provide important learning on whether the part can be made consistently, as well as to provide a tool that can be used to make test parts.

One method of rapidly prototyping containers or parts is investment casting using patterns generated by rapid prototyping systems instead of traditional injection molded wax patterns. An example of such a pattern is a QUICKCAST™ pattern, a Trademark of 3D Systems, Inc. of Valencia, Calif. A hollow plastic pattern is coated with a thin ceramic shell usually by a dipping process. The plastic is burned out of the ceramic shell leaving minimal amounts of ash residue behind. Molten metal is then poured into the ceramic shell to cast a metal part or metal mold for a plastic part. Because the shell has only a small hole for admitting molten metal, it is difficult to inspect the critical surfaces for ash residue. Any ash residue on a critical surface will potentially ruin the metal casting. The molten metal cools and shrinks such that critical surfaces are not reproduced accurately. The larger the parts, the greater the inaccuracy.

An improved method of constructing a fully dense mold is disclosed in U.S. Pat. No. 5,507,336 issued to Tobin, April, 1996. The method comprises placing a pattern within a tube which has a melting point greater than that of the infiltration material which will be used in making the metal mold. A ceramic member is cast between the pattern surfaces and the open end of the tube to transfer the critical pattern surfaces to the ceramic member. The ceramic surfaces are inverse to the pattern surfaces. The pattern is burned out and the ceramic surfaces remains in the tube. The ceramic is then covered with metal powder and an infiltration material from the other end of the tube, and the tube is placed in a furnace to form the metal part over the ceramic surfaces. The metal part has surfaces inverse to the ceramic surfaces. A metal mold results when the ceramic piece is removed. The metal mold has the same shape as the pattern, and is useful for molding plastic parts having an inverse shape. This is an ideal process for parts having exterior critical surfaces.

Tobin's process destroys the pattern from which the ceramic mold is created. A process for quickly forming a ceramic mold pattern which does not destroy the pattern, but which is accurate, is needed. Also, it is often necessary to provide a mating metal mold for plastic part molding. In order to do this, the metal mold may require a shape which is the inverse of the pattern. Thus, the ceramic mold needs to have the same shape as the pattern, and therefore requires an intermediate mold be produced between the ceramic mold and the pattern. As with Tobin's earlier process, any ceramic mold should not be contaminated on its surface so that the resulting metal mold is accurate.

In order to avoid destroying the pattern, it is desirable to use an intermediate mold made of a material which can be discarded or reused as needed to transfer the critical pattern surfaces to the ceramic mold. Wax and silicone rubbers have been used for these purposes. Wax (which is heat reversible) has the disadvantage of being brittle and when removed from the pattern can cause small pieces to break off especially where undercuts and thin features are involved. It also can expand and crack the ceramic when heated. Silicone rubbers need to be cured, and when the ceramic releases heat as it "sets", the silicone rubber can distort and cause inaccuracies to develop in the ceramic pattern. Also, silicone rubber has to be removed from the pattern by air injection or other means which forces the silicone from the ceramic. This can cause the ceramic mold to break especially where undercuts and thin features are involved.

It is therefore an object of this invention to provide a process for making a ceramic mold having the same shape as a pattern, which produces accurate reproductions of a pattern of any size, within a tolerance of ±0.005 inches and which does not leave an ash or other residue on the ceramic mold.

It is also an object of this invention to provide a process which uses an elastic, heat reversible material to make an inverse intermediate mold of a pattern and which is not distorted during the forming of a ceramic mold therefrom, but which can be removed easily from the ceramic mold without destroying the delicate features of the ceramic mold.

These and other objects will be evident from the description herein.

SUMMARY Of THE INVENTION

In one aspect of the present invention a method of forming a ceramic mold comprises the step of placing a pattern having critical pattern surfaces in a flask having an open end. The critical pattern surfaces face upward toward the open end. Successive steps include adding a concentrated heat reversible gel solution to the flask to cover the critical pattern surfaces, and cooling the gel solution to form an elastic solid gel mold. The gel mold has critical gel mold surfaces inverse to the critical pattern surfaces. Further steps include removing the pattern from the elastic gel mold, casting a ceramic mold around the gel mold, and liquifying the gel mold via heating for removal from the ceramic mold. The ceramic mold has critical ceramic surfaces inverse to the critical gel mold surfaces, thereby accurately replicating the critical pattern surfaces. The method may further comprise the step of degassing the gel solution as it is cooled to form the gel mold.

The heat reversible gel solution preferably comprises a gel material, water, and a defoaming agent. The gel material is preferably gelatin. The gel solution may further comprises fibers or other thickeners. The defoaming agent is preferably a silicone.

In another aspect of the present invention, a method of forming a ceramic mold comprises the step of placing a pattern having critical pattern surfaces in a first flask having an open end with the critical pattern surfaces facing upward toward the open end. Other steps involve covering the critical pattern surfaces with a gelatin solution added to the first flask and cooling the gelatin solution while degassing it to form an elastic solid gelatin mold. The gelatin mold has critical gelatin mold surfaces transferred from the critical pattern surfaces which are inverse to the critical pattern surfaces. Other steps are removing the pattern and the first flask from the gelatin mold and placing the gelatin mold in a second flask with the critical gelatin mold surfaces facing upward toward an open end of the second flask. Further steps include covering the critical gelatin mold surfaces with a ceramic solution added to the second flask while degassing the ceramic solution. The ceramic solution solidifies and then exothermically binds to form a ceramic mold around the gelatin mold. The ceramic mold has critical ceramic surfaces transferred from the critical gelatin mold surfaces which are inverse to the critical gelatin mold surfaces. The ceramic critical surfaces thereby accurately replicate the critical pattern surfaces. Final steps are liquifying the gelatin mold via heating to remove the gelatin from the ceramic mold and removing the second flask from the ceramic mold. The gelatin solution preferably comprises gelatin, water, and a defoaming agent.

In still another aspect of the present invention, a method of forming a ceramic mold comprises the step of placing a pattern having critical pattern surfaces in a first flask having an open end with the critical pattern surface facing upward toward the open end. Other steps involve covering the critical pattern surfaces with a gelatin solution added to the first flask and cooling the gelatin solution while degassing the gelatin solution to form an elastic solid gelatin mold. The gelatin mold has critical gelatin mold surfaces transferred from the critical pattern surfaces which are inverse to the critical pattern surfaces. Additional steps are removing the pattern and the first flask from the gelatin mold and placing the gelatin mold in a second flask with the critical gelatin mold surfaces facing upward toward an open end of the second flask. The second flask is dimensioned to provide an annular space around the gelatin mold. Still another step is filling the annular space with a first ceramic solution added to the second flask while degassing the first ceramic solution.

The first ceramic solution solidifies without generating heat to form a first ceramic mold in order to anchor the gelatin mold in place and to form a continuous annular rim surrounding the critical gel mold surfaces. A further step includes covering the first ceramic mold and the gel mold with a second ceramic solution added to the second flask. The second ceramic solution exothermically binds to form a second ceramic mold bonded to the first ceramic mold. The second ceramic mold has critical ceramic surfaces transferred from the critical gelatin mold surfaces which are inverse to the critical gelatin mold surfaces. The critical ceramic surfaces thereby accurately replicate the critical pattern surfaces. Final steps are liquifying the gelatin mold via heating to remove the gelatin from the first ceramic mold and removing the second flask from the first and second ceramic molds.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

As used herein, the term "ceramic" refers to a material such as plaster, clay, silica or other nonmetallic material which can be fired to create a hardened product.

As used herein, the term "gel" refers to a material which generally forms a colloidal gel or solid material which is elastic or rubbery, yet solid and not brittle. Gelatin is a preferred material for making a gel. It forms a tender elastic solid which does not expand or shrink with temperature changes within the range that the gel experiences while in contact with a ceramic pouring which sets into a solid shape; yet the gel melts or liquifies when the ceramic shape is heated or undergoes a further exothermic reaction.

As used herein, the term "heat reversible" refers to a material which solidifies at a temperature below about 50° C. and which melts or liquifies at temperatures above about 65° C.

Figure 1:
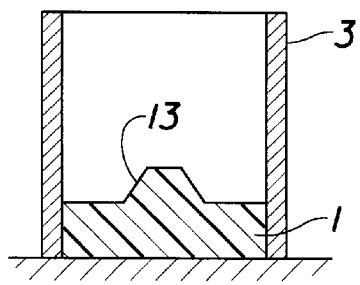
FIG. 1 is a sectioned front elevational view of a pattern 1, having critical pattern surfaces 13, positioned inside a first flask 3.

FIG. 1 illustrates a pattern 1 which fits tightly against an internal surface of a flask. Pattern 1 is a representation of the exterior of a bottle closure. Pattern 1 has critical pattern surfaces, 13, which represent the detail on the outside of the bottle closure. The pattern is preferably made by a stereolithography process, well known in the prototyping art, in which an electronic file describing the pattern is rapidly fabricated by laser curing of a polymer. The pattern is placed in the flask with critical pattern surfaces facing upward toward the open end of the flask.

An elastic material is poured over the pattern. The elastic material may be an RTV silicone rubber. Making such rubber patterns is common in the art. The step of removing a rubber mold from the pattern may comprise pulling the rubber pattern directly from the pattern or air ejecting it therefrom, since it is flexible and does not adhere to the pattern. Alternatively, the elastic material may be a solid gel made from a heat reversible material, such as a hydrocolloidal gelatin solution. Gelatin easily disperses or dissolves in hot water and forms a tender elastic material when cooled.

The elastic mold is intended to be an intermediate mold which transfers the critical pattern surfaces to a ceramic mold. A ceramic solution is similarly poured over the elastic mold in an open flask and allowed to harden. However, the ceramic material typically generates heat in an exothermic binding reaction. Such heat may cause an RTV silicone rubber to expand and distort the geometry of the critical surfaces. Also, a silicone rubber mold must eventually be removed from the ceramic mold by pulling or air ejecting it from the ceramic mold. Where there are thin sections or undercuts involved, such removal steps may damage the brittle ceramic mold.

Gelatin is easily removed from a ceramic mold by melting it. The exothermic reaction of the ceramic typically melts the gelatin adjacent to it so that surface distortions do not occur as the ceramic hardens. The resulting ceramic mold can be washed with hot water, glycerin, or acetic acid to remove any residue before firing the ceramic mold to harden it.

Gelatin is a protein which is usually derived from meat and some dairy products. It forms a structure or matrix of intertwined and partially associate protein molecules in which the water is entrapped. The preferred gelatin is 250 Bloom edible porkskin gelatin available from Kind & Knox Gelatin, Sioux City, Iowa.

Other gelling systems which meet these criteria can be used. Lambda carrageenan and mixtures of xanthan gum and locust bean gum can be used. Fibers or other structural materials can be dispersed in the gel. These will add strength and can be easily removed with the melted gel from the ceramic mold.

The more concentrated the gel solution, the better. Generally, a gelatin solution is formed which contains gelatin solids, water, and a surfactant or defoaming agent. More preferably, a gelatin solution contains solid gelatin, water, and a defoaming agent. An exemplary mixture is 475 cc of water, 25 cc of defoaming agent, and 175 grams of gelatin. Similar proportions are used for other gel systems and the determination of the exact level is well within the skill of a person in this art. Other additives which can bind water or lower the water activity of the gel can be added. For example, glycerin, sugar or glycols can be added.

Typically, the gelatin is added to cold water. Then the mixture is heated. The water and gelatin or gel material is warmed to a range from about 80° C. to about 100° C. Alternatively, the gelatin or other gel material can be added to hot water. The solution is stirred until the gel is dissolved or dispersed so that the mixture appears to be homogeneous. Preferably, the solution is heated in a microwave oven to maintain the temperature of the water and enhance the dispersion. The solution can be placed under a vacuum during the dispersion to prevent foaming. Other degassing processes can also be used.

The surfactant or defoaming agent is preferably added to the water before combining the water with the gelatin. Silicones and nonionic surfactants are good defoaming agents. Dimethyl silicone can be used. A preferred defoaming agent is: polydimethylsiloxane available as Foam Drop-S from Spectrum Services of Cincinnati, Ohio.

Figure 2:
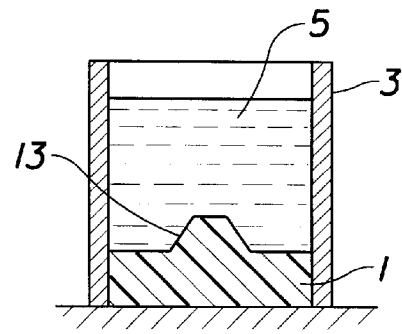
FIG. 2 is a sectioned front elevational view of pattern 1 inside the first flask 3 into which a concentrated gel solution 5 has been poured.

The gel dispersion is poured over the pattern in an open ended flask. (see FIG. 2). Of some concern is moisture absorption by the pattern when the hot gelatin solution is poured onto it. Resins used in stereolithography are often moisture sensitive. It may therefore be beneficial to seal the surface of the pattern first by spraying on a thin coating of KRYLON™ paint, a product of Sherwin Williams Co., of Solon, Ohio.

Degassing is also beneficial at the gelatin pouring stage. Pouring may be done in a vacuum chamber at 30 inches of mercury vacuum, for example. The entrained air is removed to prevent air bubbles from collecting at the pattern/gel interface. Air or gas entrained within the gel may also cause the gel matrix to be unstable. The gelatin casting may be done in multiple pours, depending on the size of the part, so that degassing is more effective in removing air bubbles. The first pour of a multiple pour is preferably allowed to form a skin before the next pour so that air bubbles will not penetrate the first pour.

The flask is refrigerated until the gel has formed an elastic solid structure. Depending on the concentration of the gel, the size of the pattern, and the depth of the gel layer, from about 1 to about 15 hours are required to set the gel. Generally, from about two to eight hours in a refrigerator at 40° F. or 4° C. is sufficient. Very concentrated solutions will form an elastic solid structure within a few hours at room temperatures.

The depth of the gel solution will depend upon the pattern and the size that is desired for the ceramic mold. One skilled in the art can easily determine this without undue experimentation. Typically, a minimum gel thickness of about one inch is desired above each critical pattern surface.

The solidified intermediate gel mold is then pulled from the pattern. In a preferred embodiment, the flask is built with easily removable sides which are then pulled off the gel mold and the gel mold is then pulled off the pattern. The gel mold is structurally elastic enough to easily release the pattern piece and retain inverse replications of the the critical surfaces of the pattern without distortion, even when undercuts and thin features are involved.

It is preferred that the gel mold be stored at refrigerator temperatures, but not frozen. The protein holds the water within its matrix and prolonged exposure to warm temperatures above about 18° C. can cause the water to be released. This can affect the accuracy of gel mold critical surfaces.

Figure 3:
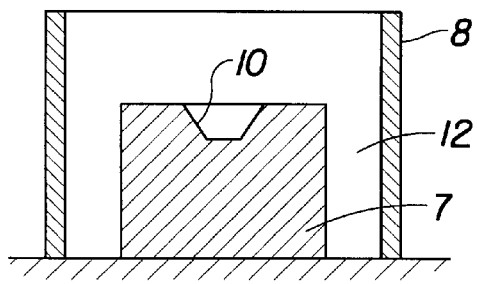
FIG. 3 is a sectioned front elevational view of a solidified gel mold 7, having critical gel mold surfaces 10 transferred from critical pattern surfaces 13, positioned inside a second flask 8 with an annular space 12 between second flask 8 and solidified gel mold 7.
Figure 4:
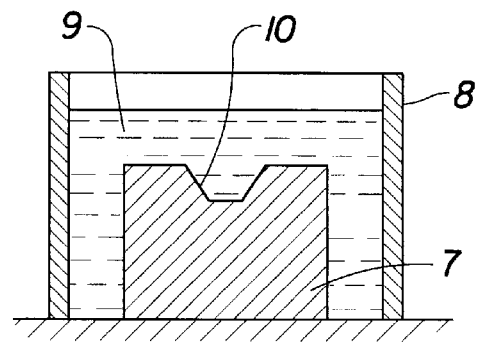
FIG. 4 is a sectioned front elevational view of second flask 8 having a plaster or ceramic solution 9 poured over the solidified gel mold 7 and into annular space 12 and covering critical gel mold surfaces 10.
Figure 5:
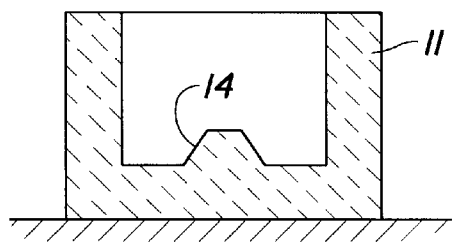
FIG. 5 is a sectioned front elevational view of a solidified plaster mold 11 from which has been removed second flask 8 and gel mold 7, exposing critical ceramic surfaces 14, which transferred from critical gel mold surfaces 10 and which accurately replicate critical pattern surfaces 13.

FIG. 3 discloses the gel mold placed in a second flask to which a plaster or ceramic solution will be added. The gel mold is placed with the critical gel mold surfaces facing upward toward the open end of the second flask. Preferably, sufficient space is allowed between the second flask and the gel mold so that ceramic will be formed around the gel mold in that space. The ceramic mold made therefrom will have a continuous annular ceramic rim surrounding the critical ceramic surfaces so that the ceramic mold may be readily used for casting a metal infiltration mold without the need for another flask.

Plaster or other ceramic material is poured into the second flask to a depth above the gel mold. Preferably, the depth is from about 1 cm to about 5 cm above the gel mold. The poured ceramic material is preferably degassed under vacuum to remove any air which could affect the final ceramic mold formation. The plaster or ceramic material first "sets" or takes a solid shape and then completely solidifies. During the binding process, an exothermic reaction takes place in the plaster which melts the surrounding gel. The flask is preferably coated with a release agent so that the flask may be easily removed from the ceramic mold.

In a preferred embodiment, two different ceramic materials are used. The gel mold is first partially encased in a first plaster or clay material which sets up to become a rigid structure but which is not exothermic or which does not subject the gel structure to temperatures that are near its melting or liquifaction point. This non-exothermic material is typically weak. It is poured to fill or partially fill the annular space in order to anchor the gel mold, which could otherwise float upward during the casting of an entire plaster structure due to the plaster's greater density as compared to that of the gelatin. Because of the weakness of the non-exothermic ceramic, the annular wall is typically made at least one inch thick for handling purposes. The first plaster sets up in about 45–90 minutes.

Figure 6:
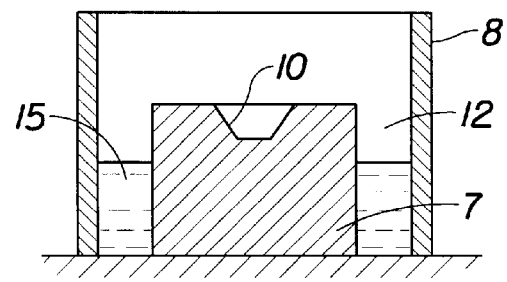
FIG. 6 is a sectioned front elevational view of an alternative embodiment to that shown in FIG. 4, wherein annular space 12 is partially filled with a non-exothermic plaster solution 15 in order to support gel mold 7 before an exothermic plaster solution (not shown) is added to second flask 8.

After the first ceramic mold has solidified, a second plaster or clay is applied to cover the first ceramic mold and the critical gel mold surfaces. The second ceramic material does undergo an exothermic reaction to increase its strength, and it bonds readily to the first ceramic mold. The exothermnic plaster typically takes about 10 minutes to set up. Icing down the binder for the second plaster may help to slow down the reaction and provide more time for degassing the plaster. The two stage plaster casting results in a more accurate ceramic mold, whose critical ceramic surfaces accurately replicate the critical pattern surfaces of the original pattern. (See FIG. 6 which discloses the use of a first plaster 15).

The preferred non-exothermic, phosphate-bonded plaster is an 847 core mix available from Ranson & Randolph of Maumee, Ohio. C1-Core Mix, also available from Ranson & Randolph of Maumee, Ohio, is the most preferred exothermic ceramic material. It is a mixture of fused silica, zirconium silicate, ammonium phosphate, silica (cristobalite) and magnesium oxide. Core hardner 2000, also available from Ranson & Randolph, can be used. It contains amorphous silica and dipotassium-6-hydroxy-3-oxo-9-xanthene-0-benzoate.

Preferably, the gel mold is at its refrigerated temperature when a ceramic solution is poured over it in the second flask. After the ceramic is set, the ceramic mold and remaining gelatin can be heated in an oven to completely melt the gel for easy removal. The temperature of the oven should be about 100° C. to about 275° C. to insure the melting of the gel but not so hot as to decompose the protein. Gelatin with water entrapped within the matrix melts or liquifies slowly and the center portion is well enough insulated that heat above 100° C. does not cause problems with the water boiling.

The open end of the ceramic mold, which corresponds to the bottom end of the second flask, allows easy access to pour the melted or liquid gel dispersion from the ceramic mold. Also, critical ceramic surfaces may be easily inspected from the open end to see that all gelatin and any residue is removed.

Placing the ceramic mold in a furnace and heating it to approximately 1100° F. (990° C.) for at least 3 hours fully sets the plaster for further processing. A hydrogen atmosphere can be used as there is no residue remaining on the ceramic which needs to be burned off. This lack of residue is an important distinction when compared to ceramic mold making processes using epoxies and waxes.

A metal mold may be made from the ceramic mold in accordance with the teachings of commonly assigned U.S. Pat. No. 5,507,336 issued to Tobin on Apr. 16, 1996, which is hereby incorporated herein by reference. However, the metal mold may be made without the need for an external tube because the ceramic mold of the present invention has a continuous annular rim surrounding the critical ceramic surfaces.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method of forming a ceramic mold comprising the steps of:
   a) placing a pattern having critical pattern surfaces in a flask having an open end, said critical pattern surfaces facing upward toward said open end;
   b) covering said critical pattern surfaces with a concentrated heat reversible gel solution added to said flask;
   c) cooling said gel solution to form an elastic solid gel mold, said gel mold having critical gel mold surfaces transferred from said critical pattern surfaces which are inverse to said critical pattern surfaces;
   d) removing said flask and said pattern from said elastic gel mold; and
   e) casting a ceramic mold around said solid gel mold, said ceramic mold having critical ceramic surfaces transferred from said critical gel mold surfaces which are inverse to said critical gel mold surfaces, said critical ceramic surfaces thereby accurately replicating said critical pattern surfaces; and
   f) liquifying said gel mold for removal from said ceramic mold.

2. The process according to claim 1 further comprising the step of degassing said gel solution as it is cooled to form an elastic solid gel mold.

3. The method according to claim 1 wherein said gel solution further comprises fibers or other thickeners.

4. A method for forming a ceramic mold comprising the steps of:
   a) placing a pattern having critical pattern surfaces in a first flask having an open end, said critical pattern surfaces facing upward toward said open end;
   b) covering said critical pattern surfaces with a gelatin solution added to said first flask and;
   c) cooling said gelatin solution while degassing said gelatin solution to form an elastic solid gelatin mold, said gelatin mold having critical gelatin mold surfaces transferred from said critical pattern surfaces which are inverse to said critical pattern surfaces;
   d) removing said pattern and said first flask from said gelatin mold and placing said gelatin mold in a second flask with said critical gelatin mold surfaces facing upward toward an open end of said second flask;
   e) covering said critical gelatin mold surfaces with a ceramic solution added to said second flask while degassing said ceramic solution, said ceramic solution solidifying and then exothermically binding to form a ceramic mold around said gelatin mold, said ceramic mold having critical ceramic surfaces transferred from said critical gelatin mold surfaces which are inverse to said critical gelatin mold surfaces, said ceramic critical surfaces thereby accurately replicating said critical pattern surfaces; and f) liquifying said gelatin mold via heating to remove said gelatin from said ceramic mold and removing said second flask from said ceramic mold.

5. The method according to claim 4 wherein said gelatin solution further comprises fibers or other thickeners.

6. A method for forming a ceramic mold comprising the steps of:
   a) placing a pattern having critical pattern surfaces in a first flask having an open end, said critical pattern surfaces facing upward toward said open end;
   b) covering said critical pattern surfaces with a gelatin solution added to said first flask and;
   c) cooling said gelatin solution while degassing said gelatin solution to form an elastic solid gelatin mold, said gelatin mold having critical gelatin mold surfaces transferred from said critical pattern surfaces which are inverse to said critical pattern surfaces;
   d) removing said pattern and said first flask from said gelatin mold and placing said gelatin mold in a second flask with said critical gelatin mold surfaces facing upward toward an open end of said second flask, said second flask dimensioned to provide an annular space around said gelatin mold;
   e) filling said annular space with a first ceramic solution added to said second flask while degassing said first ceramic solution, said first ceramic solution solidifying without generating heat to form a first ceramic mold in order to anchor said gelatin mold in place and to form a continuous annular rim surrounding said critical gelatin mold surfaces;
   f) covering said first ceramic mold and said gelatin mold with a second ceramic solution added to said second flask, said second ceramic solution exothermically binding to form a second ceramic mold bonded to said first ceramic mold, said second ceramic mold having critical ceramic surfaces transferred from said critical gelatin mold surfaces which are inverse to said critical gelatin mold surfaces, said critical ceramic surfaces thereby accurately replicating said critical pattern surfaces; and
   g) liquifying said gelatin mold via heating to remove said gelatin from said first and second ceramic molds and removing said second flask from said first and second ceramic molds.

7. The method according to claim 6 wherein said gelatin solution further comprises fibers or other thickeners.

* * * * *